United States Patent [19]
Someya et al.

[11] Patent Number: 5,500,286
[45] Date of Patent: * Mar. 19, 1996

[54] MULTI-SHELL EMULSION PARTICLE

[75] Inventors: Kousuke Someya; Akihiro Yamazaki, both of Yokohama; Futoshi Hoshino, Tokyo; Takeshi Yanagihara, Chigasaki, all of Japan

[73] Assignee: Mitsui Toatsu Chemicals, Incorporated, Tokyo, Japan

[*] Notice: The portion of the term of this patent subsequent to Dec. 28, 2010, has been disclaimed.

[21] Appl. No.: 341,110

[22] Filed: Nov. 18, 1994

Related U.S. Application Data

[62] Division of Ser. No. 189,995, Feb. 1, 1994, Pat. No. 5,409,776, which is a continuation of Ser. No. 730,236, Jul. 15, 1991, abandoned.

[30] Foreign Application Priority Data

Jul. 16, 1990 [JP] Japan ..................... 1-185323

[51] Int. Cl.$^6$ .................. B32B 27/30; C08F 265/02; C08F 265/04; C08F 257/02
[52] U.S. Cl. .................. 428/402.24; 525/301; 525/309
[58] Field of Search .................. 428/402.24; 525/301, 525/309

[56] References Cited

U.S. PATENT DOCUMENTS

| | | |
|---|---|---|
| 3,931,061 | 1/1976 | Kohne Jer. et al. . |
| 4,427,836 | 1/1984 | Kowalski et al. . |
| 4,728,595 | 3/1988 | Hayashi et al. . |
| 4,885,320 | 12/1989 | Biale . |
| 4,972,000 | 11/1990 | Kawashima et al. . |
| 5,041,464 | 8/1991 | Hoshino et al. . |
| 5,273,824 | 12/1993 | Hoshino et al. . |

FOREIGN PATENT DOCUMENTS

| | | |
|---|---|---|
| 0254467 | 1/1988 | European Pat. Off. . |
| 0321096 | 6/1989 | European Pat. Off. . |
| 0022633 | 9/1991 | European Pat. Off. . |
| 59-59741 | 4/1984 | Japan . |
| 63-281886 | 11/1988 | Japan . |

OTHER PUBLICATIONS

English Abstract of JP 59-59741. (1984).
English Abstract of JP 63-281886. (1988).

Primary Examiner—Vasu S. Jagannathan
Attorney, Agent, or Firm—Millen, White, Zelano & Branigan

[57] ABSTRACT

A multi-shell emulsion particle of dry state structure having one or more of penetrating pore(s) connecting the surface layer of the particle with the interior of the particle and having a particle diameter of from 0.1 to 5.0μ preferably from 0.1 to 1.2μ. The particles can be prepared by carrying out emulsion polymerization of a vinyl monomer (a) containing from 5 to 80% by weight of an unsaturated carboxylic acid to obtain a polymer (A), forming a polymer (B) in the presence of a particle consisting of the resultant polymer (A) while adding a vinyl monomer (b) in an amount of 10 times by weight or less and at a rate of 3 times by weight per hour or more for the weight of the polymer (A), and treating the resultant multi-shell emulsion polymer with an alkaline material to neutralize and swell the polymer (A); or, after the neutralization treatment, further forming a polymer (C) by adding and emulsion-polymerizing a vinyl monomer (c) in an amount of 20 times by weight or less for the total weight of the polymer (A) and polymer (B). The emulsion particle is useful as a component of resin compositions for paints, paper-coating and heat-sensitive recording materials.

13 Claims, 1 Drawing Sheet

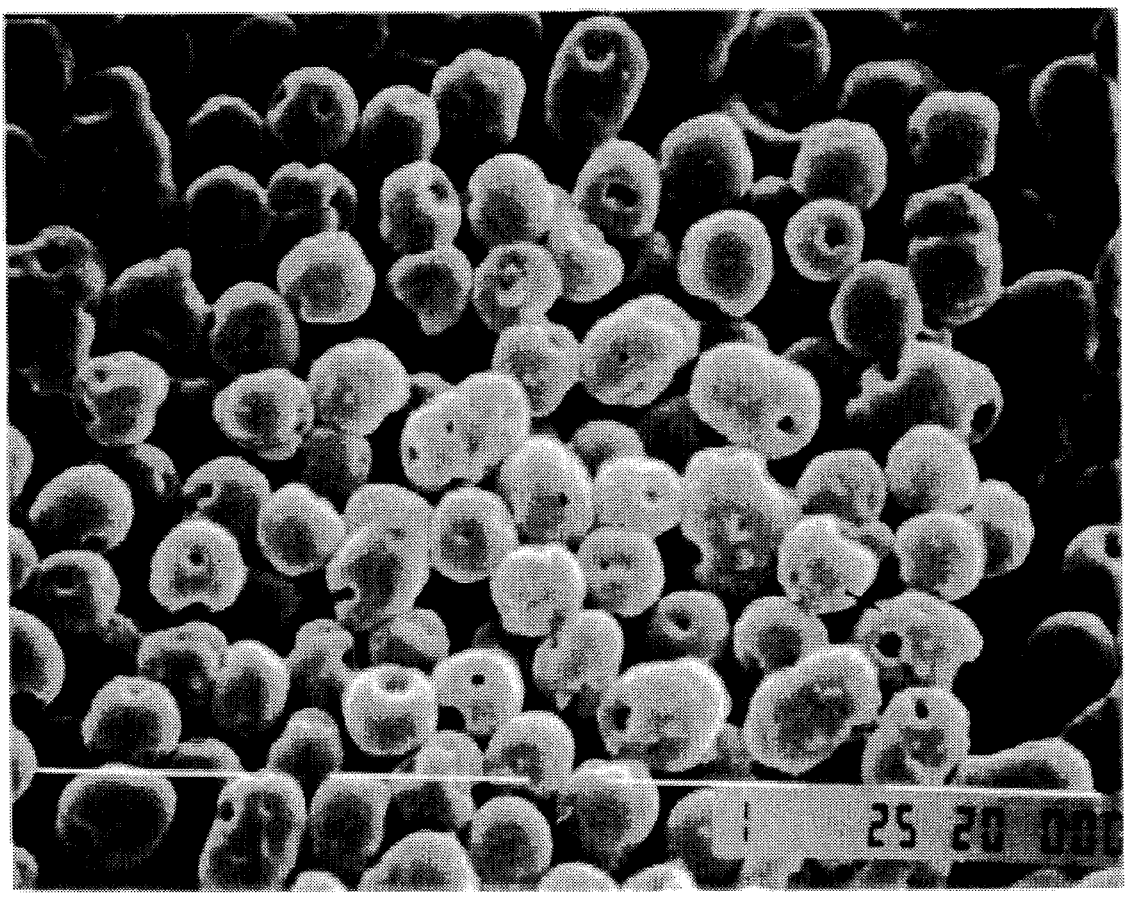

MULTI-SHELL EMULSION PARTICLE

This application is a divisional of application Ser. No. 08/189,995, filed Feb. 1, 1994, now U.S. Pat. No. 5,409,776 which is a continuation of application Ser. No. 07/730,236, filed Jul. 15, 1991 now abandoned.

BACKGROUND OF THE INVENTION a) Field of the Invention

The present invention relates to a multi-shell emulsion particle which is useful as an additive to coating compositions for paints, paper coating and information recording papers, and has a penetrating pore in the interior of the particle.

b) Description of the Related Art

In recent years, high molecular weight polymer particles prepared by emulsion polymerization have been studied for utilization as organic pigments in various fields.

The most commonly used polymer particles are homogeneous and solid, emulsion-polymerized polystyrene particles having a diameter of 0.2 to 0.5μ. For example, Japanese Laid-Open Patent 59741 (1984) discloses a process for copolymerizing an unsaturated carboxylic acid and a vinyl monomer in the presence of an anionic surface active agent and/or a nonionic surface active agent to prepare a copolymer emulsion wherein more than 90% of the particles have a diameter of 0.20 to 0.28μ.

The patent also describes that the copolymer emulsion can be used as an organic pigment in applications such as paper coating and paints. However, the organic pigment obtained by the process fails to provide sufficient hiding power, brightness and gloss, and no practical advantage is obtained unless it is used in a large amount. Consequently, the pigment leads to problems such as high cost and weight increase.

In order to further improve hiding power, brightness and gloss, conversion from the above homogeneous and solid particles to pored emulsion particles has recently been proposed in U.S. Pat. No. 4,427,836. The pored emulsion particles are obtained by mixing a core material, a polymer dispersion, formed by copolymerizing at least 5% by weight of an unsaturated carboxylic acid, with at least one of a monoethylenically unsaturated shell monomer for forming a shell polymer, carrying out emulsion polymerization, neutralizing the resulting emulsion with an aqueous, volatile base to swell the core polymer and thereafter drying to form minute openings in the interior of the particles. When the emulsion particles thus obtained are used for an organic pigment, the hiding power and brightness have been found to be better, though not satisfactory, than those of the above homogeneous and solid particles.

The swelled core polymer in the interior of the particles contain moisture. The moisture evaporates by drying the particles to make the void. However, the moisture must transmit through the layer of shell polymer of particles and hence evaporation becomes difficult. Larger voids lead to larger amount of moisture contained and result in a disadvantage of decreased drying ability. When the above particles are used as an organic pigment for paper coating, remarkable improvement cannot be observed on printability such as receptivity to inks, ink-setting ability and blistering property.

On the other hand, Japanese Laid-Open patent 281886 (1988) discloses an example for improving coloring sensitivity of a heat-sensitive recording paper by employing the above particles having minute openings for the undercoat of the paper to enhance heat insulation property. The heat-sensitive recording paper prepared by the process has some improvement in color developing sensitivity as compared with recording papers prepared by using inorganic pigments or urea resin. However, no improvement is observed on the foreign matter adhesion to a thermal head and sticking.

As mentioned above, emulsion particles having minute openings in the interior have been improved in view of hiding power and brightness as an organic pigment. On the other hand, lack of oil absorbing property and gas permeability due to the particle structure is a serious disadvantage as a pigment and leads to problems in practical use.

OBJECTS AND SUMMARY OF THE INVENTION

An object of the present invention is to provide an excellent multi-shell structured emulsion particle without impairing hiding power and brightness of an organic pigment.

Another object of the present invention is to provide a multi-shell structured emulsion particle which can be applied to an organic pigment which is useful for paint, paper coating and heat-sensitive recording materials.

The above objects of the present invention can be accomplished by providing a multi-shell emulsion particle comprising a dry state structure having one or more of penetrating pore connecting the surface layer of the particle with the interior thereof and a particle diameter of from 0.1 to 5.0μ.

A preferred multi-shell emulsion particle has a void in the interior of the particle in a dry state and a pore penetrating from the particle surface to the interior void. The particle diameter is preferably in the range of from 0.1 to 1.2μ.

The above emulsion particle can be prepared by carrying out emulsion polymerization of a vinyl monomer (a) comprising from 5 to 80% by weight of an unsaturated carboxylic acid, forming a polymer (B) in the presence of a particle consisting of the resultant polymer (A) while adding a vinyl monomer (b) in an amount of 10 times by weight or less and at a rate of 3 times by weight per hour or more for the weight of the polymer (A), and treating the resultant multi-shell emulsion polymer with an alkaline material to neutralize and swell the polymer (A); or, after the neutralization treatment, further forming a polymer (C) by adding and emulsion-polymerizing a vinyl monomer (c) in an amount of 20 times by weight or less for the total weight of the polymer (A) and polymer (B).

The morphological characteristics of the multi-shell emulsion particle in the invention lead to an excellent oil absorption property and gas permeability which have been lacking in conventional organic pigments. The morphological and functional features of the particle do not give adverse effect on the hiding power and brightness.

For example, in cases where the particle is used for a pigment or a filler of coating compounds and paper coating compositions, the emulsion particle can replace a portion or the whole of titanium dioxide, kaolin clay and calcium carbonate. In these cases, auxiliary functions such as oil absorption property and gas permeability can be provided without impairing the excellent hiding power and brightness. The emulsion particle is also useful for heat-sensitive recording materials. Further, the emulsion particle has effect on weight saving and improves hardness, abrasion resistance and thermal resistance. Hence the emulsion particle can also be applied as an additive to various compositions which are used for paper, metals, plastics, fibers and cloth.

BRIEF DESCRIPTION OF THE DRAWING

FIG. 1 is a scanning type electron microscope photograph (magnification 20000) of a multi-shell emulsion particle obtained by the process of Polymerization Example 1 and having a penetrating pore.

DETAILED DESCRIPTION OF THE INVENTION

The multi-shell emulsion particle of the invention will be illustrated on the monomer composition of polymer constituting each layer of the particle.

The polymer (A) is prepared by emulsion polymerization of the vinyl monomer (a) which contains the unsaturated carboxylic acid. The vinyl monomer (a) is a compound or a combination of compounds selected from methyl (meth)acrylate, ethyl (meth)acrylate, butyl (meth)acrylate and other (meth)acrylate esters; styrene, α-methylstyrene, vinyltoluene and other aromatic vinyl compounds; (meth)acrylonitrile and other vinyl cyano compounds; vinyl chloride, vinylidene chloride and other halogenated vinyl compounds; and butadiene. The unsaturated carboxylic acid is a compound or a mixture of compounds selected from (meth)acrylic acid, crotonic acid, fumaric acid, itaconic acid and other monobasic or dibasic acids; maleic acid alkyl ester, fumaric acid alkyl ester and other monoalkyl esters of dibasic acids. Acrylic acid and methacrylic acid are preferred in particular. The amount of the unsaturated carboxylic acid copolymerized in preferably from 5 to 80 parts by weight, more preferably from 10 to 50 parts by weight for 100 parts by weight of the vinyl monomer (a). When the amount of the unsaturated carboxylic acid in the polymer (A) is less than 5 parts by weight, treatment with the alkaline material cannot sufficiently swell the polymer (A) and cannot form the penetrating pore. On the other hand, the amount of 80 parts by weight or more impairs stability in polymerization, develops a large amount of coagulated products and cannot form a stable emulsion.

In the process of preparing the polymer (A), a functional monomer is used, if desired, in order to stabilize the emulsion of the polymer (A). Exemplary functional monomers which can be used include unsaturated sulfonic acid salts such as sodium styrenesulfonate; unsaturated bases such as dimethylaminoethyl methacrylate; (meth)acrylate esters such as 2-hydroxyethyl (meth)acrylate and glycidyl (meth)acrylate; and amides such as (meth)acrylamide and N-methylol(meth)acrylamide.

A crosslinkable monomer can also be used as a component of the polymer (A) so long as the monomer can copolymerize with the monomer for constituting the polymer (A). Examples of the crosslinkable monomer include divinylbenzene, ethylene glycol di(meth)acrylate, trimethylolpropane tri(meth)acrylate and other monomers having at least two polymerizable unsaturated bonds in a molecule. The amount of the crosslinkable monomer is in the range of usually from 0 to 8% by weight, preferably from 0.1 to 5% by weight, more preferably from 0.2 to 1% by weight for the weight of the monomer constituting the polymer (A).

Application of the crosslinkable monomer increases molecular weight of the polymer (A) and inhibits diffusion of the exterior-layer-constituting polymer (B) into the interior of the particle. Thus the polymer (B) can be favorably formed in the exterior of the particle. Also it can be favorably carried out in the treatment with the alkaline material to inhibit dissolution of the polymer (A) in the aqueous phase and accompanied viscosity increase of the aqueous phase. However, the amount of the crosslinkable monomer exceeding 8% by weight inhibits swelling of the polymer (A) by the alkaline material and thus particles of the desired shape cannot be obtained.

In the next step, the vinyl monomer (B) is added to the particles consisting of the polymer (A) and emulsion polymerization is carried out to form the polymer (B) in the exterior of the particles of polymer (A).

The vinyl monomer (b) which can be used includes, for example, a compound or a combination of the compound selected from styrene, α-methylstyrene, vinyltoluene and other aromatic vinyl compounds; methyl (meth)acrylate, ethyl (meth)acrylate, butyl (meth)acrylate and other (meth)acrylate esters; (meth)acrylonitrile and other vinyl cyano compounds; vinyl chloride, vinylidene chloride and other halogenated vinyl compounds; and butadiene.

A functional monomer may be used, if desired, in order to provide stability of emulsion in the preparation process. Exemplary functional monomers which can be used include (meth)acrylic acid, crotonic acid, itaconic acid, and other unsaturated carboxylic acids; sodium styrenesulfonic acid and other unsaturated sulfonic acid salts; 2-hydroxyethyl (meth)acrylate, glycidyl (meth)acrylate and other (meth)acrylate esters; and (meth)acrylamide and N-methylol(meth)acrylamide.

As mentioned above, the vinyl monomer (b) can contain the unsaturated carboxylic acid in order to provide stability for the emulsion. The proportion of the unsaturated carboxylic acid in the vinyl monomer (b) is usually lower than the proportion in the vinyl monomer (a) and preferably in the range of from 0.1 to 2.0% by weight. When the proportion of the unsaturated carboxylic acid is higher in the vinyl monomer (b) than in the vinyl monomer (a), swelling ability of the polymer (B) becomes larger than that of the polymer (A) and the desired particle having a penetrating pore cannot be obtained.

The vinyl monomer (b) can also contain a crosslinkable monomer which can copolymerize with the vinyl monomer (b) in order to improve the resistance of the desired particle to blocking, heat and solvent. The crosslinkable monomers which can be used include, for example, divinyl benzene, ethylene glycol di(meth)acrylate, trimethylolpropane trimethacrylate and other monomers having two or more polymerizable unsaturated bonds in a molecule. The effect of the crosslinkable monomer can be exhibited in the range of usually from 0 to 3% by weight, preferably from 0.1 to 3% by weight, more preferably from 0.2 to 2% by weight for the weight of the above vinyl monomer (b). Use of more than 3% of weight is unfavorable because stability in the polymerization is liable to be impaired.

No particular restriction is imposed on the combination of the above monomers. However, it is preferred to select the monomers so that the polymer (B) has a glass transition temperature of 50° C. or above, preferably 70° C. or above.

The above multi-shell emulsion particle is prepared by common emulsion polymerization process. In the process of the invention, the polymer (B) is formed in the exterior of a core particle consisting of the polymer (A) and then, after or during the treatment with the below described alkaline material, the vinyl monomer (c) is added and emulsion polymerized to form the polymer (C) in the exterior of a particle of the polymer (B).

The vinyl monomer (c) which can be used for forming the polymer (C) includes, for example, styrene, -methylstyrene, vinyltoluene and other aromatic vinyl compounds; methyl (meth)acrylate, ethyl (meth)acrylate, butyl (meth)acrylate and other (meth)acrylate esters; (meth)acrylonitrile and other vinyl cyano compounds; vinyl chloride, vinylidene chloride and other halogenated vinyl compounds; and butadiene. These monomers can be used singly or in combination.

In the addition and emulsion polymerization of the vinyl monomer (c), a functional monomer can be used, if desired, in order to provide stability of the emulsion. Exemplary functional monomers which can be used include (meth)acrylic acid, crotonic acid, itaconic acid and other unsaturated carboxylic acids; sodium styrenesulfonate and other unsaturated carboxylic acid salts; 2-hydroxyethyl (meth)acrylate, glycidyl (meth)acrylate and other (meth)acrylate esters; and (meth)acrylamide and N-methylol (meth)acrylamide. The amount of the functional monomer is in the range of usually from 0 to 20% by weight, preferably from 0.1 to 10% by weight, more preferably from 0.1 to 5% by weight for the weight of the above vinyl monomer (c). When the functional monomers are used more than 20% by weight, secondary particles are liable to develop, moisture resistance decreases and viscosity increase in the alkali treatment becomes larger. These influences make practical use difficult. The preferred amount of the unsaturated carboxylic acid in the vinyl monomer (c) is 3% by weight or less. Use of more than 3% accelerates coagulation.

The vinyl monomer (c) can be incorporated with a crosslinkable monomer, if desired. The crosslinkable monomers which can be used include, for example, divinylbenzene, ethylene glycol di(meth)acrylate, trimethylolpropane trimethacrylate and other monomers having at least two polymerizable unsaturated bonds in a molecule. The amount of the crosslinkable monomer is in the range of usually from 0 to 3% by weight, preferably from 0.1 to 3% by weight, more preferably from 0.2 to 2% by weight for the weight of the above vinyl monomer (c).

Use of the crosslinkable monomer can improve resistance to blocking, heat and solvent. However, use of more than 3% inhibits swelling of the polymer (A) in the treatment with the alkaline material. On the other hand, addition of less than 0.1% by weight, effect of the crosslinkable monomer is poor.

No particular restriction is placed on the combination of the above monomers. However, the glass transition temperature of the polymer (C) obtained is preferably 50° C. or above, more preferably 70° C. or above.

The process for forming each layer of the multi-shell emulsion particle will be illustrated below.

Formation of each layer is generally carried out by common emulsion polymerization process in the presence of a surface active agent and a polymerization initiator.

The surface active agents which can be used include, for example, a single agent or a combination of the agent selected from anionic surface active agents such as sodium alkylbenzenesulfonate, sodium alkylsulfate, sodium dialkylsulfosuccinate and naphthalenesulfonic acid/formaldehyde condensate; and nonionic surface active agents such as polyoxyethylene alkyl ether, polyoxyethylene alkylphenol ether, ethylene oxide/propylene oxide block copolymer and sorbitan fatty acid ester.

No particular limitation is imposed upon the amount of the surface active agent. The amount is usually from 0.1 to 10% by weight for the total weight of the monomer used in each layer.

Any kind of polymerization initiator which is commonly used in emulsion polymerization processes can be used for the present invention. Representative polymerization initiators include, for example, persulfates such as potassium persulfate, sodium persulfate and ammonium persulfate; organic peroxides such as benzoyl hydroperoxide; and azo compounds such as azobisisobutyronitrile. The polymerization initiator can be used, if desired, together with a reducing agent in the form of a redox type initiator.

In the preparation of an emulsion consisting of the polymer (A), polymerization is carried out by adding the monomer (a) at one time, in portions or continuously as a stream of droplets in the presence of the above surface active agent and the polymerization initiator. The polymerization is carried out at a temperature of 20° to 90° C. in a nitrogen atmosphere.

In emulsion polymerization, a process for adding a vinyl monomer in the presence of a seed particle in order to provide a polymerization spot of a particle has been known as "seed polymerization". The process can also be used in the invention.

No particular restriction is imposed upon the composition of the seed particle. However, the diameter of the seed particle is preferably 0.07μ or less in order to give no adverse effect on the performance of the particle finally obtained.

The diameter of the particle consisting of the polymer (A) thus formed is preferably from 0.08 to 0.2μ, more preferably from 0.1 to 0.15μ. When the particle diameter is less than 0.08μ, the below-described polymer (B) is formed in the interior of the particle. On the other hand, when the particle diameter exceeds 0.2μ, the polymer (B) covers the particle. In both cases, the desired particle having a penetrating pore cannot be obtained.

Polymerization is further carried out by adding the vinyl monomer (b) at one time, in portions or continuously to the thus-formed emulsion consisting of the polymer (A).

Alternatively, the emulsion consisting the polymer (A) may be previously prepared in a separate step, and charged to a new polymerization vessel. Successively vinyl monomer (b) may be added as above to carry out polymerization. That is, the preparation processes of the polymer (A) and the polymer (B) may be carried out continuously in one step, individually in a separate step or in a combined step. No particular restriction is placed on the polymerization step.

The amount of the vinyl monomer (b) is usually from 1 to 10 times by weight, preferably from 1.5 to 8 times by weight, more preferably from 2 to 6 times by weight for the weight of the polymer (A). When the amount of monomer (b) is less than the same weight as the polymer (A), the particle consisting of the polymer (A) is very imperfectly covered with the polymer (B) and thus the desired particle having the penetrating pore cannot be obtained. On the other hand, when the amount of the monomer (b) exceeds 10 times by weight, the particle is completely covered with the polymer (B) and hence the desired particle having the penetrating pore cannot be obtained. The vinyl monomer (b) is added at a rate of generally 3 times or more, preferably from 4 to 12 times, more preferably from 4.5 to 10 times, most preferably from 5 to 9 times by weight per hour for the weight of the polymer (A). When the weight is less than 3 times, the charging rate is too slow and polymerization is carried out in the neighborhood of the surface layer of the particle composed of the polymer (A). Thus the particle is completely covered with the polymer (B) and the desired particle having the penetrating pore cannot be obtained. On the other hand, when the amount is more than 12 times, the charging rate is too quick and the polymer (B) forms in the interior of the particle. Thus the desired particle having the penetrating pore cannot be obtained.

The polymerization is carried out in the presence of the above persulfate at a temperature of preferably from 60° to 100° C., more preferably from 70° to 90° C. Polymerization temperature exceeding 100° C. is disadvantageous because increased pressure is required. Polymerization temperature lower than 60° C. leads to decreased conversion rate of the vinyl monomer (b) during polymerization and a stable emulsion cannot be obtained.

By simultaneous use of persulfate and a suitable reducing agent, the polymerization can be carried out with a high conversion ratio even at a temperature of from 30° to 50° C. However, the desired particle having the penetrating pore cannot be obtained. The phenomenon is assumed that the polymer (B) is formed in the vicinity of the surface layer of the particle composed of the polymer (A).

The above-obtained emulsion particle is treated with the alkaline material to give the desired multi-shell emulsion particle which has a void, a preferred morphology, in the interior and at least one pore penetrating from the particle surface to the interior void and has a particle diameter in the range of from 0.1 to 5μ, preferably from 0.1 to 1.2μ.

Further, the vinyl monomer (c) is added after the treatment with the alkaline material and the most exterior layer consisting of the polymer (C) is formed by polymerization to obtain another desired multi-shell emulsion particle which has a void in the interior and at least one pore penetrating from the particle surface to the interior void and has a particle diameter in the range of from 0.1 to 5.0μ, most preferably from 0.1 to 1.2μ without closing the penetrating pore, and increasing a thickness of the exterior layer and a strength of the particle itself. In the object of the present invention, the most exterior layer is more preferably polymerized.

The amount of the vinyl monomer (c) is preferably from 1 to 20 times, more preferably from 1.5 to 15 times, most preferably from 2 to 10 times for the total weight of polymer (A) and polymer (B). When the amount of the vinyl monomer (c) is more than 20 times for the total weight of polymer (A) and polymer (B), the polymer (C) completely covers the polymer (B), the penetrating pore does not develop on the particle surface and hence the desired particle cannot be obtained.

The emulsion particle obtained by forming the polymer (B) is treated with the alkaline material by the following process.

Exemplary alkaline materials which can be used include inorganic alkaline compounds such as potassium hydroxide and sodium hydroxide; volatile alkaline compounds such as ammonia; and organic alkaline compounds such as dimethylethanolamine and trimethylamine.

The alkali treatment is carried out in the range of pH 7 to pH 12, preferably pH 8 to pH 11. In lower than pH 7, swelling becomes difficult and the desired particle cannot be obtained. On the other hand, in higher than pH 12, stability of the emulsion is severely impaired and the treatment itself cannot be smoothly carried out.

The alkali treatment is carried out at a temperature of from 50° to 100° C., preferably from 70° to 98° C., more preferably from 80° to 95° C. The temperature lower than 50° C. causes incomplete plasticization of the exterior layer and hence leads to insufficient swelling of the particle. As a result, the desired particle cannot be obtained.

The thus-obtained multi-shell emulsion particle having a particle diameter of from 0.1 to 5.0μ, most preferable 0.1 to 1.2μ is characterized by having a void in the interior of the particle and at least one penetrating pore which connects particle surface with the interior of the particle.

The mechanism for developing the morphology of the multi-shell emulsion particle in the invention is not clear. When the vinyl monomer (b) is polymerized under the above mentioned conditions, it is assumed that the polymer (A) is not completely covered with the polymer (B) and partly exposed to the surface of the particle. As a result, in the alkali treatment of the particle, the polymer (A) swells and forms the penetrating pore to the interior of the particle. At the same time, the vinyl polymer (C) polymerizes on the surface of the polymer (B). The polymer (C) is thought to be formed while remaining the pore as intact to obtain the particle having the desired structure. The structure of said particle can be identified with ease by observing the particle itself or a section of the particle with an electron microscope.

The diameter of the emulsion particle obtained in the invention is usually from 0.1 to 5.0μ, preferably from 0.1 to 4.0μ, most preferably from 0.1 to 1.2μ, further preferably from 0.3 to 1.0μ. When the particle diameter is less than 0.1μ, the particle cannot be used for an organic pigment because of considerably low hiding power and brightness, even though the particle has the above interior structure. On the other hand, the particle having a diameter exceeding 5μ, more exactly 1.2μ cannot form a stable emulsion.

The particle of the invention has hiding power and brightness which are equivalent or superior to those of the emulsion particle having a singly hollowed structure and additionally has an excellent oil absorption property and gas permeability.

The reason is not clear and assumed that the void ratio in the interior of the particle is extremely enhanced due to the presence of usually from one to several penetrating pores and, at the same time, the existence of the penetrating pore provides the excellent oil absorption property and gas permeability for the particle.

As a result of the above characteristics, the multi-shell emulsion particle of the invention can increase hiding power and brightness and additionally enhance oil absorption property and gas permeability in cases where the particle is used for coating compounds, paper coating compositions or heat-sensitive recording materials. The particle can replace a portion or the whole of pigments such as titanium dioxide, clay and kaolin which are commonly added to the above compounds, compositions and materials, and can also provide specific functions such as oil absorption property and gas permeability.

EXAMPLE

The present invention will hereinafter be illustrated in detail by way of examples. Parts and percent indicate parts by weight and percent by weight, respectively.
[Preparation of multi-shell emulsion particle]
Polymerization Example 1

To a separable flask equipped with a stirrer, thermometer and a reflux condenser, 2500 parts of water were charged and heated to 80° C. with stirring while replacing the atmosphere with nitrogen. The internal temperature was maintained at 80° C., 1.5 parts of potassium persulfate was added as a polymerization initiator and dissolved.

An emulsion was previously prepared by adding 16 parts of styrene, 0.3 part of methacrylic acid and 0.2 part of divinylbenzene with stirring to a solution containing 0.2 part of sodium dodecylsulfate in 7 parts of water.

The emulsion thus prepared was charged to the separable flask and reacted for an hour to prepare a seed particle emulsion.

At this stage, a small amount of the seed particle emulsion was sampled and the diameter of the emulsion particle was measured by a dynamic light scattering method. The diameter was 0.06μ.

Separately, an emulsion of the vinyl monomer (a) was prepared by adding 55 parts of methyl methacrylate, 5 parts of butyl acrylate and 40 parts of methacrylic acid with stirring to a solution containing 0.3 part of sodium dodecylsulfate in 40 parts of water.

To the seed particle emulsion, the emulsion thus obtained was continuously added over an hour and reacted. After finishing the addition, the reaction mixture was aged for an hour to obtain the polymer (A). The diameter of the particle consisting of the polymer (A) was 0.12μ by a dynamic light scattering analysis.

Successively, a solution containing 3 parts of ammonium persulfate in 30 parts of water is added as a polymerization initiator. Separately an emulsion of the vinyl monomer (b) was prepared by adding 468 parts of methyl methacrylate, 120 parts of butyl acrylate and 12 parts of methacrylic acid with stirring to a solution of 1.2 parts of sodium dodecyl sulfate in 240 parts of water. The emulsion of monomer (b) thus obtained was continuously added over an hour to the above emulsion of the polymer (A) and reacted. After finishing the addition, the reaction mixture was further aged for 2 hours to form the polymer (B) on the surface of the polymer (A).

After finishing the polymerization, 490 parts of the emulsion thus obtained and 78 parts of water were charged to another separable flask equipped with a stirrer, thermometer and a reflux condenser and 8.5 parts of a 28% aqueous ammonia solution were added with stirring. The emulsion was pH 10.0 after addition of ammonia. Then the internal temperature of the flask was increased to 85° C. and stirring was continued for 30 minutes at the same temperature to carry out treatment with the alkaline material.

Successively, a solution containing 0.5 part of ammonium persulfate in 5 parts of water was added as a polymerization initiator. Separately an emulsion of the vinyl monomer (c) was prepared by adding 297 parts of styrene and 3 parts of acrylonitrile with stirring to a solution containing 0.6 part of sodium dodecylsulfate in 120 parts of water. The emulsion of monomer (c) thus obtained was continuously added over 90 minutes to the emulsion of the polymer (C) and reacted. After finishing the addition the reaction mixture was further aged for 90 minutes to form the polymer (C) on the surface of the polymer (B).

The emulsion thus obtained had a non-volatile content of about 40%. The particle had a penetrating pore and a diameter of 0.50μ.

Polymerization Examples 2–5

The same procedures as described in Polymerization Example 1 was carried out by adding the same amount of the vinyl monomer (a) and changing its composition alone. The results are illustrated in Table 1.

Comparative Polymerization Examples 1–2

In Polymerization Example 1, the seed particle emulsion was prepared by changing the amount of sodium dodecylsulfate from 0.2 part to 2 parts. As a result, the particle of the polymer (A) had a diameter of 0.06μ by a dynamic light scattering analysis. Thereafter the same procedures as described in Polymerization Example 1 were carried out. Results are illustrated in Table 1 as Comparative Polymerization Example 1.

Further, similarly to Comparative Polymerization Example 1, the amount of sodium dodecylsulfate was changed from 0.2 part to 0.02 part. As a result, the polymer (A) had a diameter of 0.26μ by a dynamic light scattering analysis. The results are illustrated in Table 1 as Comparative Polymerization Example 2.

Comparative Polymerization Example 3

In Polymerization Example 1, 1 part of methacrylic acid was used in the vinyl monomer (a) and the same procedures as described in Polymerization Example 1 were carried out. The results are illustrated in Table 1 as Comparative Polymerization Example 3.

Comparative Polymerization Example 4–5

Procedures of Polymerization Example 1 were repeated except that 85 parts of methacrylic acid were used in the vinyl monomer (a). Results are illustrated in Table 1 as Comparative Polymerization Example 4.

Procedures of Polymerization Example 1 were repeated except that 10% by weight of a crosslinkable monomer divinylbenzene was used for the weight of the vinyl monomer (a). Results are illustrated in Table 1 as Comparative Polymerization Example 5.

Polymerization Examples 6–12

Procedures of Polymerization Example 1 were repeated except that the same amount of the vinyl monomer (b) was added and only the composition was varied. Results are illustrated in Table 2 as Polymerization Examples 6–10.

Procedures of Polymerization Example 1 were repeated except that the addition amount of the vinyl monomer (b) was changed. The results are illustrated in Table 2 as Polymerization Examples 11–12.

Comparative Polymerization Example 6

In Polymerization Example 1, the emulsion was prepared by changing the procedures for forming the polymer (B) as follows.

The polymer (A) was prepared by repeating the procedures described in Polymerization Example 1. Thereafter the reaction mixture was cooled to 30° C., 3 parts of sodium hydrogen sulfite were added, followed by adding a solution containing 3 parts of ammonium persulfate in 30 parts of water and thereafter continuously adding an emulsion containing the same vinyl monomer (b) as in Polymerization Example 1 over an hour while maintaining the reaction temperature at 30° C. After finishing the addition, the reaction mixture was warmed to 80° C. and aged for 2 hours. Thus the polymer (B) was formed by redox polymerization on the surface of the polymer (A). Thereafter the same procedures were carried out as described in Polymerization Example 1. Results are illustrated in Table 2.

Comparative Polymerization Examples 7–8

Procedures of Polymerization Example 1 were repeated except that the vinyl monomer (b) containing 20% of methacrylic acid was used. Results are illustrated in Table 2 as Comparative Polymerization Example 7.

Procedures of Polymerization Example 1 were repeated except that 5% of divinylbenzene was used for the weight of the vinyl monomer (b). Results are illustrated in Table 2 as Comparative Polymerization Example 8.

Comparative Polymerization Examples 9–12

The same procedures described in Polymerization Example 1 were carried out except that the emulsion containing the vinyl monomer (b) was continuously added over 6 hours and reacted. Results are illustrated in Table 2 as Comparative Polymerization Example 9.

In Comparative Polymerization Example 10, the emulsion of the vinyl monomer (b) was added over 20 minutes.

In Comparative Polymerization Examples 11 and 12, the addition amount of the vinyl monomer (b) was varied. Results are illustrated in Table 2.

Examples 13–19

In Polymerization Examples 13–16, the procedures described in Polymerization Example 1 were carried out by adding the same amount of the vinyl monomer (c) and by changing the composition of the vinyl monomer (c) alone.

In Polymerization Examples 17–18, the procedures described in Polymerization Example 1 were carried out by changing the addition amount of the vinyl monomer (c).

In Polymerization Example 19, the procedures of Polymerization Example 1 were repeated except that the addition of the vinyl monomer (c) was omitted and only the treatment with the alkaline material was conducted.

Results are illustrated in Table 3.

Comparative Polymerization Examples 13–16

In Comparative Polymerization Example 13, procedures described in Polymerization Example 1 were carried out by using the vinyl monomer (c) containing 5% of methacrylic acid.

In Comparative Polymerization Example 14, 5% of divinylbenzene was used in the procedures of Polymerization Example 1.

In Comparative Polymerization Example 15, procedures described in Polymerization Example 1 were repeated except that treatment with the alkaline material and polymerization of the vinyl monomer (c) were conducted at pH 6.5.

In Comparative Polymerization Example 16, the procedures of Polymerization Example 1 were repeated except that the addition amount of the vinyl monomer (c) was varied.

Results are illustrated in Table 3.

Oil absorption was measured on the particles prepared above according to JIS K-5101. Sample powder was prepared by drying the emulsion at 50° C. for 24 hours, crushing in a mortar and passing through a #150 mesh sieve. Results are illustrated in Tables 1–3.

TABLE 1

| | Composition of vinyl monomer (a) | | | | | | | Particle diameter of polymer (A) [μ] | Particle diameter [μ] | Penetrating pore | Oil absorption [%] |
|---|---|---|---|---|---|---|---|---|---|---|---|
| | MMA | BA | EA | AN | MAc | HEMA | DVB | | | | |
| Poly. Ex. | | | | | | | | | | | |
| 1 | 55 | 5 | | | 40 | | | 0.12 | 0.50 | O | 83 |
| 2 | | 20 | 30 | 10 | 40 | | 0.2 | 0.10 | 0.56 | O | 82 |
| 3 | 70 | | 10 | | 15 | 5 | | 0.13 | 0.48 | O | 79 |
| 4 | | 40 | | | 60 | | 0.5 | 0.09 | 0.57 | O | 81 |
| 5 | 50 | 32 | | 5 | 8 | 5 | 0.1 | 0.12 | 0.43 | O | 80 |
| Comp. Poly. Ex. | | | | | | | | | | | |
| * 1 | 55 | 5 | | | 40 | | | 0.06 | 0.18 | X | 53 |
| * 2 | 55 | 5 | | | 40 | | | 0.26 | 1.15 | X | 55 |
| 3 | 94 | 5 | | | 1 | | | 0.11 | 0.43 | X | 54 |
| ** 4 | 10 | 5 | | | 85 | | | — | — | — | — |
| 5 | 45 | 5 | | | 40 | | 10 | 0.07 | 0.42 | X | 51 |

* Particle diameter of seed emulsion differs from Polymerization Example 1.
** Coagulation occurs in polymerization process. Emulsion cannot be obtained.

TABLE 2

| | Composition of vinyl monomer (b) | | | | | | | Particle diameter [μ] | Penetrating pore | Oil absorption (%) |
|---|---|---|---|---|---|---|---|---|---|---|
| | MMA | ST | BA | MAc | AAc | AM | DVB | | | |
| Poly. Ex. | | | | | | | | | | |
| 6 | | | 503 | 60 | 36 | | 1 | 0.51 | O | 82 |
| 7 | 342 | 240 | | 12 | | 6 | | 0.54 | O | 78 |
| 8 | 370 | 180 | 20 | 30 | | | | 0.60 | O | 78 |
| 9 | 589 | | | | 6 | 3 | 2 | 0.56 | O | 80 |
| 10 | 108 | 480 | | 12 | | | | 0.40 | O | 70 |
| 11 | 312 | | 80 | 8 | | | | 0.41 | O | 75 |
| 12 | 624 | | 160 | 16 | | | | 0.62 | O | 83 |
| Comp. Poly. Ex. | | | | | | | | | | |
| * 6 | 468 | | 120 | 12 | | | | 0.52 | X | 56 |
| ** 7 | 360 | | 120 | 120 | | | | — | — | — |
| 8 | 438 | | 12 | 12 | | | 30 | 0.44 | X | 50 |
| *** 9 | 468 | | 120 | 12 | | | | 0.49 | X | 52 |
| **** 10 | 468 | | 120 | 12 | | | | 0.48 | X | 51 |
| 11 | 39 | | 10 | 1 | | | | 0.35 | X | 51 |
| 12 | 1404 | | 360 | 36 | | | | 0.83 | X | 49 |

* Polymer (B) is obtained by redox polymerization. Void is found in the interior. No penetrating pore is found.
** Polymer (C) coagualtes in the polymerization. Emulsion cannot be formed.

TABLE 2-continued

|  | Composition of vinyl monomer (b) | | | | | | Particle diameter [μ] | Penetrating pore | Oil absorption (%) |
|---|---|---|---|---|---|---|---|---|---|
|  | MMA | ST | BA | MAc | AAc | AM | DVB | | |

\*\*\* Emulsion of vinyl monomer (b) is added over 6 hours (6 times of Polymerization Example 1). Void is found in the interior. No penetrating pore is found.
\*\*\*\* Emulsion of vinyl monomer (b) is added over 20 minutes (⅓ times of Polymerization Example 1).
\*\*\*\*\* Void is found in the interior. No penetrating pore is found.

TABLE 3

|  | Composition of vinyl monomer (c) | | | | | | Particle diameter [μ] | Penetrating pore | Oil absorption [%] |
|---|---|---|---|---|---|---|---|---|---|
|  | ST | MMA | i-BMA | AN | MAc | DVB | | | |
| Poly. Ex. | | | | | | | | | |
| 13 |  | 297 |  |  | 3 |  | 0.48 | O | 80 |
| 14 | 297 |  |  |  | 3 |  | 0.48 | O | 79 |
| 15 | 297 |  |  |  |  | 3 | 0.45 | O | 77 |
| 16 | 97 |  | 200 | 3 |  |  | 0.39 | O | 71 |
| 17 | 198 |  |  | 2 |  |  | 0.41 | O | 75 |
| 18 | 396 |  |  | 4 |  |  | 0.62 | O | 83 |
| 19 |  |  |  |  |  |  | 0.35 | O | 67 |
| Comp. Poly. Ex. | | | | | | | | | |
| \*\* 13 | 285 |  |  |  | 15 |  | — | — | 54 |
| \*\*\* 14 | 285 |  |  |  |  | 15 | 0.42 | X | 60 |
| \*\*\*\* 15 | 297 |  |  | 3 |  |  | 0.40 | X | 51 |
| \*\*\* 16 | 4950 |  |  | 50 |  |  | 1.05 | X | 55 |

\* Polymer (B) is treated with alkaline material without addition of vinyl monomer (c).
\*\* Coagualtion occurs in polymerization process. Emulsion cannot be obtained.
\*\*\* Void is found in the interior. No penetrating pore is found.
\*\*\*\* Treatment with alkaline material is carried out at pH 6.5.

[Examples of Resin Composition for Paper Coating]

Examples 1

The performance of emulsions obtained in the above Polymerization Examples and Comparative Polymerization Examples were evaluated as organic pigments and organic fillers for use in paper coating field.

The formulation and evaluation procedures are illustrated below.

|  | Part |
|---|---|
| Kaolin clay UW-90 (Trade mark of a product from EMC Co.) | 90 |
| Pigment or filler | 10 |
| Aron T-40 (Trade mark of a product from Toagosei Chemical Ind.) | 0.09 |
| MS-4600 (Trade mark of a product from Nippon Food Industrial Co.) | 3 |
| Polylac 755 (Trade mark of a product from Mitsui Toatsu Chemicals Inc.) | 12 |
| Solid content of coating fluid | 62% |

The coating fluid was prepared by adding a pigment dispersant Aron T-40 (sodium polyacrylate) having a solid content of 40% to water, sufficiently dispersion kaolin clay UW-90 with a Kaules mixer and further mixing with one of the emulsion obtained in Polymerization Examples and Comparative Polymerization Examples as an organic pigment.

For the purpose of comparison, titanium dioxide paste having a solid content of 62% (a product of Dainichi Seika Co.) was used as an inorganic pigment and precipitated calcium carbonate slurry TP-222HS having a solid content of 60% (a product of Okutama Industrial Co.) was used as an inorganic filler. Phosphated starch MS-4600 as a binder and Polylac 755 having an SBR latex solid content of 50% were added as binders to obtain coating fluids.

Using an applicator, each of the above obtained coating fluids was applied to wood free paper so as to give a dry pickup of 14 to 15 g/m² and then dried at 120° C. for 20 seconds. Thereafter, under such conditions as a roll temperature of 60° C., a linear pressure of 70 kg/cm² and a speed of 10 m/min, the applied paper was passed twice through calender rolls to obtain a coated paper, and its performance was evaluated by the following methods.

Color viscosity:
Measured with a BM type viscometer at 60 r.p.m. by using a No. 4 rotor.

Gloss of coated paper:
Reflectance at an angle of 75° was measured in accordance with JIS P-8142.

Printed gloss:
Using an RI printing tester, coated paper was printed with 0.4 cc of New Bright Indigo manufactured by Toyo Ink Co. After drying, reflectance at an angle of 75° was measured in accordance with JIS P-8142.

Brightness:
Measured with a Hunter color difference meter in accordance with JIS P-8123.

Opacity:

Measured in accordance with JIS P-8138.

Dry pick:
Tested with an RI printing tester. In the evaluation, ten points were regarded as a full mark.

Wet pick:
Tested with an RI printing tester. In the evaluation, ten points were regarded as a full mark.

Ink acceptability with water:
Using a Morton roll on an RI printing tester, coated paper was printed with addition of water. Printed color density was evaluated by visual observation. In the evaluation, five points were regarded as a full mark.

Ink setting:
Using an RI printing tester, coated paper was solid printed with 0.4 cc of ink. The printed surface was immediately brought into contact with test paper and tested again with the RI printing tester. The amount of ink transferred to the test paper was measured with a Macbeth densitometer. A lower value indicates a better results.

Gas permeability:
Measured with a Ohken model gas permeability tester. A lower value indicates a better result.

Results are illustrated in Table 4.

Examples 2–19

The particles prepared in Polymerization Examples 2–19 were evaluated by the same procedures as described in Example 1. Results are illustrated in Table 4.

Comparative Examples 1–15

The particles prepared in Comparative Polymerization Examples 1–16 (Comparative Polymerization Examples 4, 7 and 13, exclusive) were evaluated by the same procedures as described in Example 1. The case where titanium dioxide or calcium carbonate was used singly (Comparative Examples 14 and 15) was also evaluated.

Results are summarized in Table 4.

TABLE 4

| No. | Pigment or filler | Color viscosity (cps) | Gloss of white paper | Printed gloss | Brightness | Opacity | Dry pick | Wet pick | RI coloring value | Ink setting | Gas permeability (second) |
|---|---|---|---|---|---|---|---|---|---|---|---|
| Example | Poly. Ex. | | | | | | | | | | |
| 1 | 1 | 1701 | 79.1 | 94.1 | 81.4 | 96.6 | 9 | 9 | 5 | 0.27 | 2550 |
| 2 | 2 | 1684 | 78.5 | 94.0 | 80.8 | 96.4 | 9 | 9 | 5 | 0.27 | 2510 |
| 3 | 3 | 1712 | 78.3 | 94.3 | 81.1 | 96.4 | 9 | 9 | 4 | 0.30 | 2860 |
| 4 | 4 | 1687 | 79.2 | 93.8 | 80.8 | 96.3 | 9 | 9 | 5 | 0.28 | 2570 |
| 5 | 5 | 1731 | 79.5 | 93.7 | 80.5 | 96.2 | 9 | 9 | 4 | 0.30 | 2790 |
| 6 | 6 | 1710 | 79.9 | 93.6 | 81.3 | 96.3 | 9 | 9 | 4 | 0.30 | 2530 |
| 7 | 7 | 1709 | 78.6 | 94.1 | 80.7 | 96.1 | 9 | 9 | 4 | 0.30 | 2520 |
| 8 | 8 | 1731 | 78.4 | 89.8 | 81.1 | 96.3 | 9 | 9 | 4 | 0.30 | 2520 |
| 9 | 9 | 1684 | 78.4 | 94.3 | 80.9 | 96.2 | 9 | 9 | 4 | 0.29 | 2640 |
| 10 | 10 | 1780 | 77.1 | 89.2 | 80.0 | 95.7 | 8 | 9 | 4 | 0.30 | 2860 |
| 11 | 11 | 1703 | 79.2 | 93.6 | 81.1 | 96.5 | 8 | 9 | 4 | 0.30 | 2930 |
| 12 | 12 | 1710 | 78.6 | 93.8 | 81.0 | 96.6 | 9 | 9 | 5 | 0.27 | 2530 |
| 13 | 13 | 1733 | 78.3 | 93.8 | 81.2 | 96.4 | 9 | 9 | 4 | 0.29 | 2540 |
| 14 | 14 | 1584 | 77.3 | 92.6 | 80.6 | 95.5 | 9 | 9 | 5 | 0.29 | 2730 |
| 15 | 15 | 1612 | 77.8 | 93.2 | 80.5 | 95.8 | 9 | 9 | 4 | 0.30 | 2690 |
| 16 | 16 | 1750 | 77.0 | 90.2 | 80.0 | 95.1 | 8 | 9 | 4 | 0.30 | 2960 |
| 17 | 17 | 1629 | 78.7 | 93.1 | 80.4 | 95.8 | 9 | 9 | 4 | 0.29 | 2980 |
| 18 | 18 | 1817 | 78.2 | 94.0 | 80.8 | 96.3 | 9 | 9 | 5 | 0.27 | 2500 |
| 19 | 19 | 1837 | 78.1 | 91.1 | 80.2 | 95.2 | 8 | 9 | 4 | 0.30 | 2990 |
| Comparative Example | Comp. Poly. Ex. | | | | | | | | | | |
| 1 | 1 | 1695 | 75.9 | 88.3 | 78.7 | 94.2 | 8 | 8 | 2 | 0.33 | 3750 |
| 2 | 2 | 1814 | 74.0 | 87.9 | 78.2 | 93.8 | 6 | 7 | 3 | 0.31 | 3190 |
| 3 | 3 | 1792 | 76.4 | 88.6 | 78.4 | 95.8 | 7 | 8 | 3 | 0.32 | 3370 |
| 4 | 5 | 1816 | 76.8 | 89.1 | 78.8 | 93.6 | 8 | 8 | 3 | 0.32 | 3320 |
| 5 | 6 | 1831 | 76.3 | 88.1 | 78.9 | 95.1 | 7 | 8 | 3 | 0.32 | 3290 |
| 6 | 8 | 1793 | 75.8 | 88.5 | 78.7 | 94.2 | 8 | 9 | 3 | 0.32 | 3310 |
| 7 | 9 | 1977 | 76.8 | 89.0 | 78.8 | 94.0 | 7 | 6 | 3 | 0.32 | 3280 |
| 8 | 10 | 1734 | 75.6 | 88.4 | 78.7 | 94.1 | 7 | 7 | 3 | 0.32 | 3290 |
| 9 | 11 | 1856 | 74.3 | 88.1 | 78.6 | 94.3 | 7 | 6 | 2 | 0.32 | 3490 |
| 10 | 12 | 1736 | 76.5 | 88.4 | 78.4 | 93.8 | 8 | 8 | 3 | 0.31 | 3200 |
| 11 | 14 | 1678 | 77.8 | 90.2 | 80.0 | 94.8 | 7 | 8 | 3 | 0.32 | 3320 |
| 12 | 15 | 1755 | 75.7 | 89.6 | 79.3 | 94.9 | 7 | 8 | 3 | 0.32 | 3360 |
| 13 | 16 | 1764 | 76.8 | 88.7 | 78.6 | 94.5 | 7 | 9 | 3 | 0.31 | 3220 |
| 14 | Titanium dioxide | 1821 | 71.2 | 88.6 | 81.7 | 97.1 | 8 | 9 | 2 | 0.33 | 3800 |
| 15 | Calcium carbonate | 1229 | 69.7 | 88.4 | 77.4 | 93.7 | 8 | 9 | 3 | 0.30 | 3500 |

[Examples of Resin Composition for Paint]

Example 20

Paint formulations were prepared by using the particles obtained in the above Polymerization Examples as organic pigments in place of a part of rutile type titanium dioxide.

As a paint vehicle, an acrylic emulsion having a resin content of 45%, Trade Mark; Almatex E-208, was used. The formulations used for preparing these paints are illustrated in Table 5.

TABLE 5

| | |
|---|---|
| Water | 45.0 parts |
| Aqueous Tamol solution (Trade Mark of Rohm & | 12.2 parts |

TABLE 5-continued

| | |
|---|---|
| Haas Co. | |
| Ethylene glycol | 40.0 parts |
| 2-amino-2-methyl propanol | 3.0 parts |
| Nopco DF-122NS (Trade Mark of Sun Nopco Co.) | 0.8 parts |
| Rutile type titanium dioxide | 164.5 parts |
| Emulsion prepared to 40% content | 102.8 parts |
| Almatex E-208 (Trade Mark of Mitsui Toatsu Chemicals Inc.) | 676.0 parts |
| Butyl cellosolve/Taxanol (½) solvent mixture | 40.0 parts |
| Hydroxymethyl cellulose/propylene glycol (1/40) mixture | 12.4 parts |
| Solid content in coating fluid | 46.9% |
| PWC (wt % pigment in solid) | 40.0% |
| Viscosity of paint | 70–80 KU |

Paints were prepared by charging water, Tamol 731, ethylene glycol, 2-amino-2-methylpropanol, Nopco DF-122NS and rutile type titanium dioxide into a pigment grinding mill and thoroughly dispersing these ingredients. Successively, one of the emulsion obtained in Examples and Comparative Examples, Almatex E-208, butyl cellosolve/Texanol and hydroxyethyl cellulose/propylene glycol were added with stirring. Viscosity of the paints was adjusted to 70 to 80 KU by using a Stomer viscometer.

The paints thus prepared were applied to slates so as to give a dry film thickness of about 40 μm, and dried at room temperature for a week. Then, the performance of the test specimen thus obtained was evaluated by the following methods.

Gloss:
Measured at an angle of 60° with a glossmeter manufactured by Suga Testing Machine Co.

Hiding Power:
Measured in accordance with JIS K-5663, using an applicator, a paint to be tested was applied to a sheet of hiding power test paper manufactured by Japan Test Panel Industrial Co. so as to give a dry film thickness of 75 μm, and dried at room temperature for a week. Thereafter, hiding power was calculated from a 45°/0° reflectance ratio.

Water resistance:
The test specimen was submerged in water for 24 hours at room temperature. Thereafter appearance of the painted film was visually observed.

Absence of disorder such as blister and whitening was judged ○.

Alkali resistance:
The test specimen was submerged in a 2% aqueous sodium hydroxide solution for 24 hours at room temperature. Thereafter appearance of the painted film was visually observed.

Absence of disorder such as blister and whitening was judged ○.

Weather resistance:
The specimen was irradiated in a weater-o-meter for 500 hours. Thereafter appearance of the painted film was visually observed.

Absence of disorder such as blister, whitening and decrease in gloss was judged ○.

Washability:
The specimen was tested in accordance with JIS K-5663.

No peel off of the painted film after washing more than 2000 times was judged ○.

No peel off of the painted film after washing from 1000 to 2000 times was judged △.

Adherence:
The painted film was given a crosscut with a cutter-knife. A cellophane tape was adhered to the crosscut portion of the painted film and then peeled off.

No stripping of the painted film at the crosscut was judged ○.

Some stripping of the painted film at the crosscut was judged △.

Results of evaluation is illustrated in Table 6.

Examples 21–38

The particles prepared in Polymerization Examples 2–19 were evaluated by the same procedures as described in Example 20. Results are illustrated in Table 6.

Comparative Examples 16–29

The particles prepared in Comparative Polymerization Examples 1–16 (Comparative Polymerization Examples 4, 7 and 13, exclusive) were evaluated by the same procedures as described in Example 20. The case of using titanium dioxide singly was evaluated in Comparative Example 29.

Results are illustrated in Table 6.

TABLE 6

| No. | Emulsion particle | TiO₂/emuslion particle (w/w) | Gloss | Hiding power (%) | Water resistance | Alkali resistance | Weather resistance | Washability | Pick |
|---|---|---|---|---|---|---|---|---|---|
| Example | Poly. Ex. | | | | | | | | |
| 20 | 1 | 80/20 | 88 | 98 | ○ | ○ | ○ | ○ | ○ |
| 21 | 2 | " | 88 | 98 | ○ | ○ | ○ | ○ | ○ |
| 22 | 3 | " | 87 | 98 | ○ | ○ | ○ | ○ | ○ |
| 23 | 4 | " | 88 | 98 | ○ | ○ | ○ | ○ | ○ |
| 24 | 5 | " | 87 | 98 | ○ | ○ | ○ | ○ | ○ |
| 25 | 6 | " | 88 | 98 | ○ | ○ | ○ | ○ | ○ |
| 26 | 7 | " | 89 | 98 | ○ | ○ | ○ | ○ | ○ |
| 27 | 8 | " | 87 | 98 | ○ | ○ | ○ | ○ | ○ |
| 28 | 9 | " | 88 | 96 | ○ | ○ | ○ | ○ | ○ |
| 29 | 10 | " | 86 | 95 | ○ | ○ | ○ | ○ | ○ |
| 30 | 11 | " | 88 | 97 | ○ | ○ | ○ | ○ | ○ |
| 31 | 12 | " | 89 | 96 | ○ | ○ | ○ | ○ | ○ |
| 32 | 13 | " | 87 | 98 | ○ | ○ | ○ | ○ | ○ |
| 33 | 14 | " | 87 | 95 | ○ | ○ | ○ | ○ | ○ |
| 34 | 15 | " | 88 | 94 | ○ | ○ | ○ | ○ | ○ |
| 35 | 16 | " | 86 | 94 | ○ | ○ | ○ | ○ | ○ |
| 36 | 17 | " | 86 | 93 | ○ | ○ | ○ | ○ | ○ |
| 37 | 18 | " | 89 | 95 | ○ | ○ | ○ | ○ | ○ |
| 38 | 19 | " | 87 | 94 | ○ | ○ | ○ | ○ | ○ |

TABLE 6-continued

| No. | Emulsion particle | TiO$_2$/emuslion particle (w/w) | Gloss | Hiding power (%) | Water resistance | Alkali resistance | Weather resistance | Wash-ability | Pick |
|---|---|---|---|---|---|---|---|---|---|
| Comparative Example | Comp. Poly. Ex. | | | | | | | | |
| 16 | 1 | " | 81 | 88 | X | X | ◯ | ◯ | ◯ |
| 17 | 2 | " | 80 | 88 | ◯ | ◯ | ◯ | ◯ | ◯ |
| 18 | 3 | " | 81 | 90 | ◯ | ◯ | ◯ | ◯ | ◯ |
| 19 | 5 | " | 82 | 91 | ◯ | ◯ | ◯ | ◯ | ◯ |
| 20 | 6 | " | 83 | 90 | ◯ | ◯ | ◯ | ◯ | ◯ |
| 21 | 8 | " | 80 | 88 | ◯ | ◯ | ◯ | ◯ | ◯ |
| 22 | 9 | " | 82 | 90 | X | X | ◯ | X | ◯ |
| 23 | 10 | " | 80 | 88 | ◯ | ◯ | ◯ | ◯ | ◯ |
| 24 | 11 | " | 82 | 89 | X | X | X | ◯ | ◯ |
| 25 | 12 | " | 81 | 91 | ◯ | ◯ | ◯ | ◯ | ◯ |
| 26 | 14 | " | 83 | 91 | ◯ | ◯ | ◯ | ◯ | ◯ |
| 27 | 15 | " | 81 | 90 | ◯ | ◯ | ◯ | ◯ | ◯ |
| 28 | 16 | " | 80 | 89 | ◯ | ◯ | ◯ | ◯ | ◯ |
| 29 | — | 100/0 | 78 | 99 | ◯ | ◯ | ◯ | ◯ | ◯ |

[Examples for Heat-sensitive Recording Materials]

Paper was used as a substrate and the multi-shell emulsion particle of the invention was used in the intermediate layer.

Examples 39–57

(1) Preparation of under coating compositions

Using the emulsion particles prepared in Polymerization Examples 1 - 19. A lend composed of 80 parts of the emulsion particle and 20 parts of a binder was thoroughly mixed to prepare an undercoating composition of the heat-sensitive recording material. Polyvinyl alcohol K-117 (Trade mark of Kuraray) was used as a binder.

(2) Preparation of compositions for heat-sensitive recording layer

Using a sand mill, fluid A (a color forming dispersion) and fluid B (a developer dispersion) were separately prepared on the basis of the following formulations.

| Ingredient | Part |
|---|---|
| (Fluid A) | |
| 3-Dimethylamino-6-methyl-7-anilinofluoran | 20 |
| 20% Aqueous hydroxyethyl cellulose solution | 5 |
| Water | 75 |
| (Fluid B) | |
| Bisphenol A | 20 |
| 20% Aqueous hydroxyethyl cellulose solution | 5 |
| Microcrystalline wax, Petrolite R-50 (Trade Mark of Halico Co.) | 5 |
| Water | 70 |

After fluids A and B were thoroughly dispersed in a sand mill, 15 parts by weight of fluid A, 40 parts by weight of fluid B, 20 parts by weight of calcium carbonate, and 25 parts by weight of a 20% aqueous solution of Polyvinyl Alcohol K-117 (manufactured by Kuraray) were mixed and stirred vigorously to obtain a heat-sensitive recording layer composition.

Using a bar coater, each of the aforesaid undercoating composition was applied to commercially available wood free paper (having an areal weight of about 50 g/m$^2$) so as to give a dry pickup of 15 g/m$^2$ and then dried. Subsequently, using a bar coater, the aforesaid thermal recording layer composition was applied thereto so as to give a dry pickup of about 15 g/m$^2$ and then dried to obtain a heat-sensitive recording paper.

Brightness of the paper was measured with a Hunter color difference meter in accordance with JIS P-8123.

Color density was tested by developing color under the following conditions with a heat-sensitive paper printing apparatus TH-PMD (Trade Mark of Okura Electric Co.). Density of developed color was measured with a Macbeth densitometer.

Applied voltage 24 V. Pulse width 1.74 ms.

Applied energy 0.34 mJ/dot.

Further, sticking and foreign matter adhesion to the head were tested by printing under the following conditions.

Applied voltage 27 V. Pulse width 3.0 ms.

Applied energy 0.73 mJ/dot.

As a result of the sticking and adhesion test, printability was classified into ⊚, ◯, △, X, and XX. Results are illustrated in Table 7.

Comparative Examples 30–42

Emulsion particles prepared in Comparative Polymerization Examples 1–16 (Comparative Polymerization Examples 4, 7 and 13, exclusive) were evaluated by the same procedures as described in Examples 39–57.

Results are illustrated in Table 7.

TABLE 7

| No. | Particle | Print density | Print-ability | Brightness |
|---|---|---|---|---|
| Example | Poly. Ex. | | | |
| 39 | 1 | 1.39 | ⊚ | 80.9 |
| 40 | 2 | 1.34 | ◯ | 80.3 |
| 41 | 3 | 1.33 | ⊚ | 80.4 |
| 42 | 4 | 1.30 | ◯ | 80.1 |
| 43 | 5 | 1.31 | ⊚ | 80.7 |
| 44 | 6 | 1.33 | ⊚ | 80.6 |
| 45 | 7 | 1.36 | ⊚ | 80.0 |
| 46 | 8 | 1.32 | ◯ | 80.4 |
| 47 | 9 | 1.30 | ⊚ | 80.7 |
| 48 | 10 | 1.35 | ◯ | 80.3 |
| 49 | 11 | 1.39 | ⊚ | 80.7 |
| 50 | 12 | 1.31 | ⊚ | 80.8 |
| 51 | 13 | 1.31 | ◯ | 80.6 |
| 52 | 14 | 1.30 | ⊚ | 80.1 |

TABLE 7-continued

| No. | Particle | Print density | Print-ability | Brightness |
|---|---|---|---|---|
| 53 | 15 | 1.38 | ⊙ | 80.0 |
| 54 | 16 | 1.34 | ○ | 80.0 |
| 55 | 17 | 1.37 | ⊙ | 80.2 |
| 56 | 18 | 1.36 | ⊙ | 80.8 |
| 57 | 19 | 1.30 | ○ | 80.7 |
| Comparative Example | Comp. Poly. Ex. | | | |
| 30 | 1 | 1.09 | Δ | 78.4 |
| 31 | 2 | 1.00 | X | 78.0 |
| 32 | 3 | 1.02 | Δ | 78.8 |
| 33 | 5 | 1.05 | Δ | 77.5 |
| 34 | 6 | 1.02 | X | 78.6 |
| 35 | 8 | 1.07 | X | 78.9 |
| 36 | 9 | 1.00 | Δ | 78.2 |
| 37 | 10 | 1.08 | Δ | 78.2 |
| 38 | 11 | 1.09 | Δ | 78.5 |
| 39 | 12 | 1.06 | Δ | 78.1 |
| 40 | 14 | 1.04 | X | 77.8 |
| 41 | 15 | 1.01 | XX | 78.6 |
| 42 | 16 | 1.10 | Δ | 78.0 |

What is claimed is:

1. A multi-shell emulsion particle prepared by emulsion polymerization of one or more vinyl monomers, comprising a dry state structure having one or more penetrating pore(s) connecting the surface layer of the particle with the interior of the particle and having a particle diameter of from 0.1 to 5.0 μm.

2. The emulsion particle of claim 1 wherein the particle has a void in the interior of the particle in a dry state and one or more penetrating pores from the particle surface to the interior void.

3. The emulsion particle of claim 1 wherein the diameter of the particle is in the range of from 0.1 to 1.2μ.

4. The emulsion particle of claim 1, wherein the one or more vinyl monomers are selected from the group consisting of methyl (meth) acrylate, ethyl (meth) acrylate, butyl (meth) acrylate, styrene, α-methylstyrene, vinyltoluene, (meth) acrylonitrile, vinyl chloride, vinylidene chloride, butadiene and mixtures thereof.

5. The emulsion particle of claim 1, wherein the one or more vinyl monomers are polymerized with a further functional monomer.

6. The emulsion particle of claim 5, wherein the functional monomer is selected from the group consisting of unsaturated sulfonic acid salts, dimethylaminoethyl methacrylate, 2-hydroxyethyl (meth)acrylate, glycidyl (meth)acrylate, (meth)acrylamide, N-methylol(meth)acrylamide and mixtures thereof.

7. The emulsion particle of claim 1, wherein the one or more vinyl monomers are polymerized with a further crosslinkable monomer.

8. The emulsion particle of claim 7, wherein the crosslinkable monomer is selected from the group consisting of divinylbenzene, ethylene glycol di(meth)acrylate, trimethylolpropane tri(meth) acrylate and mixtures thereof.

9. The emulsion particle of claim 7, wherein the crosslinkable monomer is present in an amount of 0.1 to 8% by weight of the polymer.

10. The emulsion particle of claim 1, which comprises an interior of a polymer (A) formed by emulsion polymerization of one or more vinyl monomers and an exterior of a polymer (B) formed by polymerization of one or more vinyl monomers.

11. The emulsion particle of claim 10, which further comprises an exterior of a polymer (C) formed by emulsion polymerization of one or more vinyl monomers.

12. The emulsion particle of claim 11, wherein the amount of polymer (C) is 1 to 20 times by weight of the total weight of polymer (A) and polymer (B).

13. The emulsion particle of claim 10, wherein the amount of polymer (B) is 1 to 10 times by weight of the weight of polymer (A).

* * * * *